M. G. BUNNELL.
EXCAVATOR.
APPLICATION FILED OCT. 24, 1910.
1,172,579.
Patented Feb. 22, 1916.
6 SHEETS—SHEET 2.
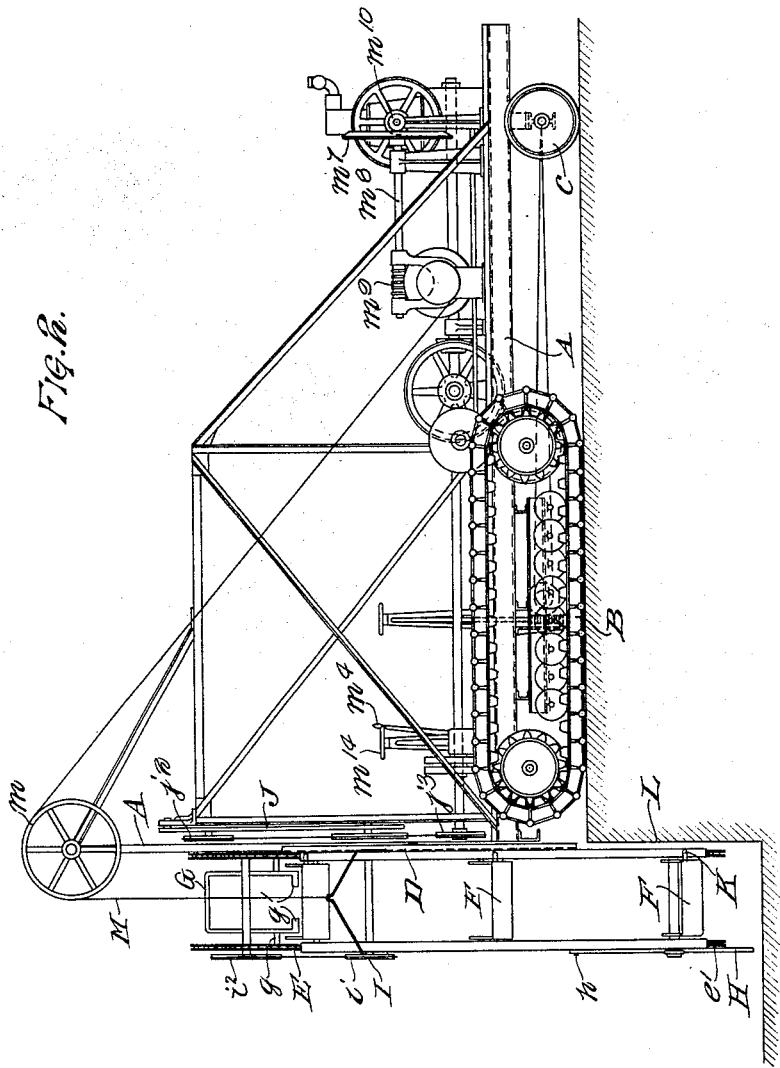
WITNESSES
A. Andersen.
E. H. Clegg
INVENTOR:
Morton G. Bunnell
By Bulkley & Durand
ATTORNEYS,

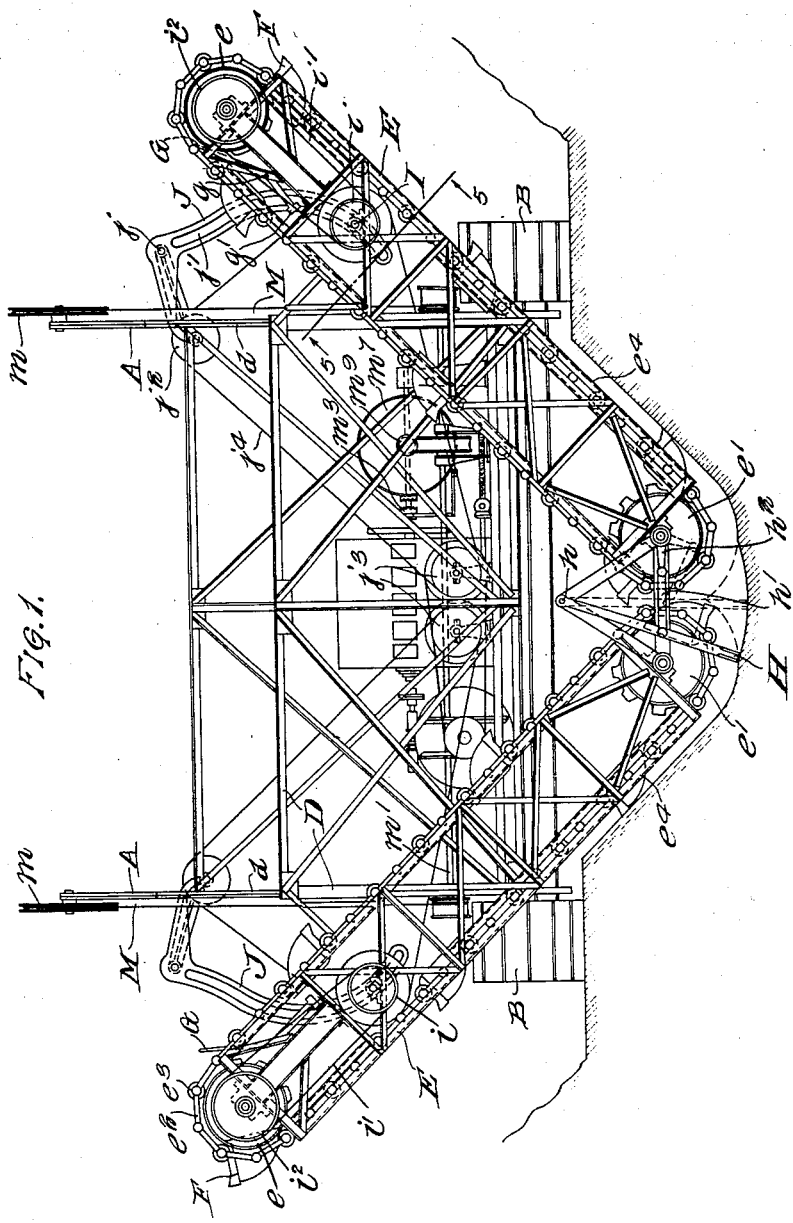

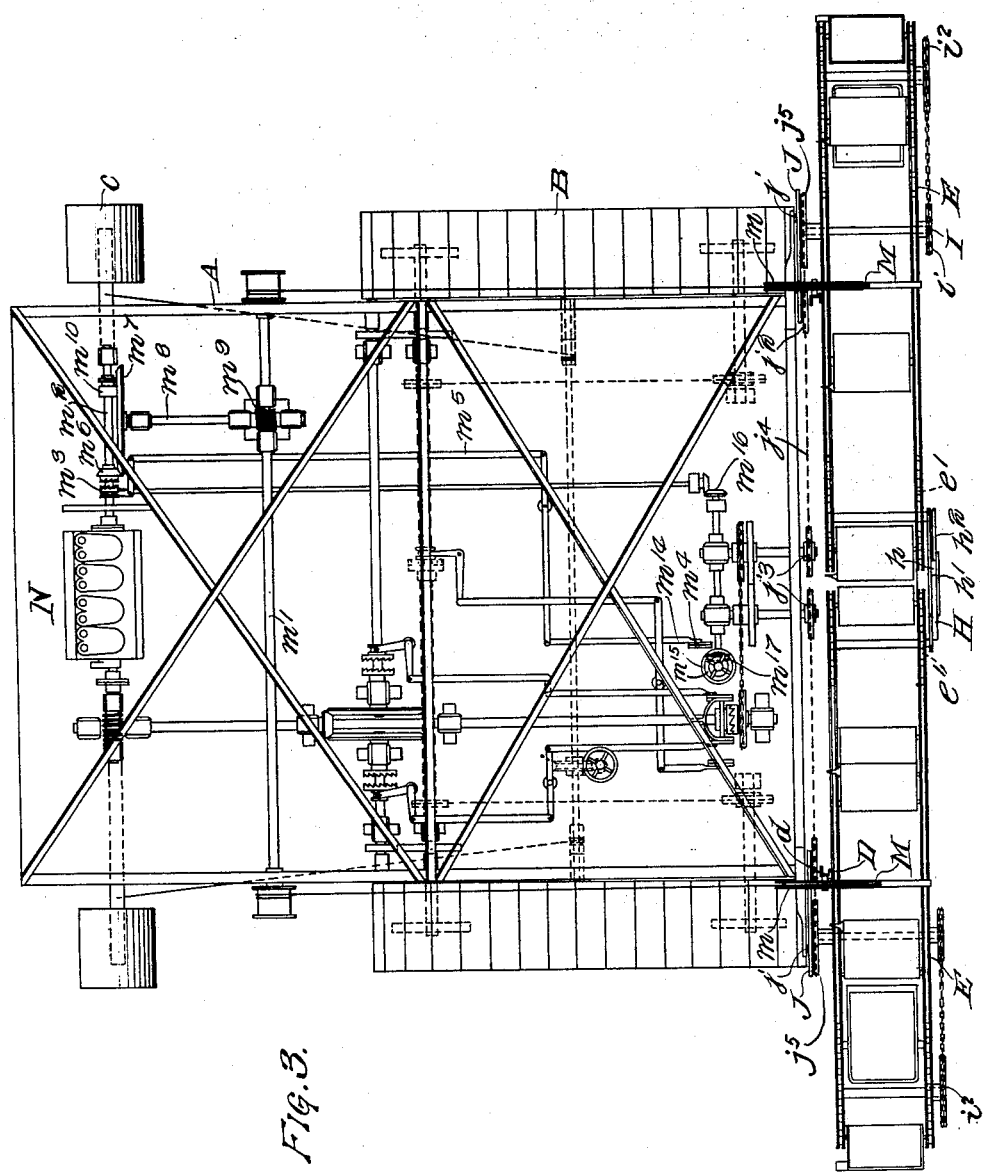

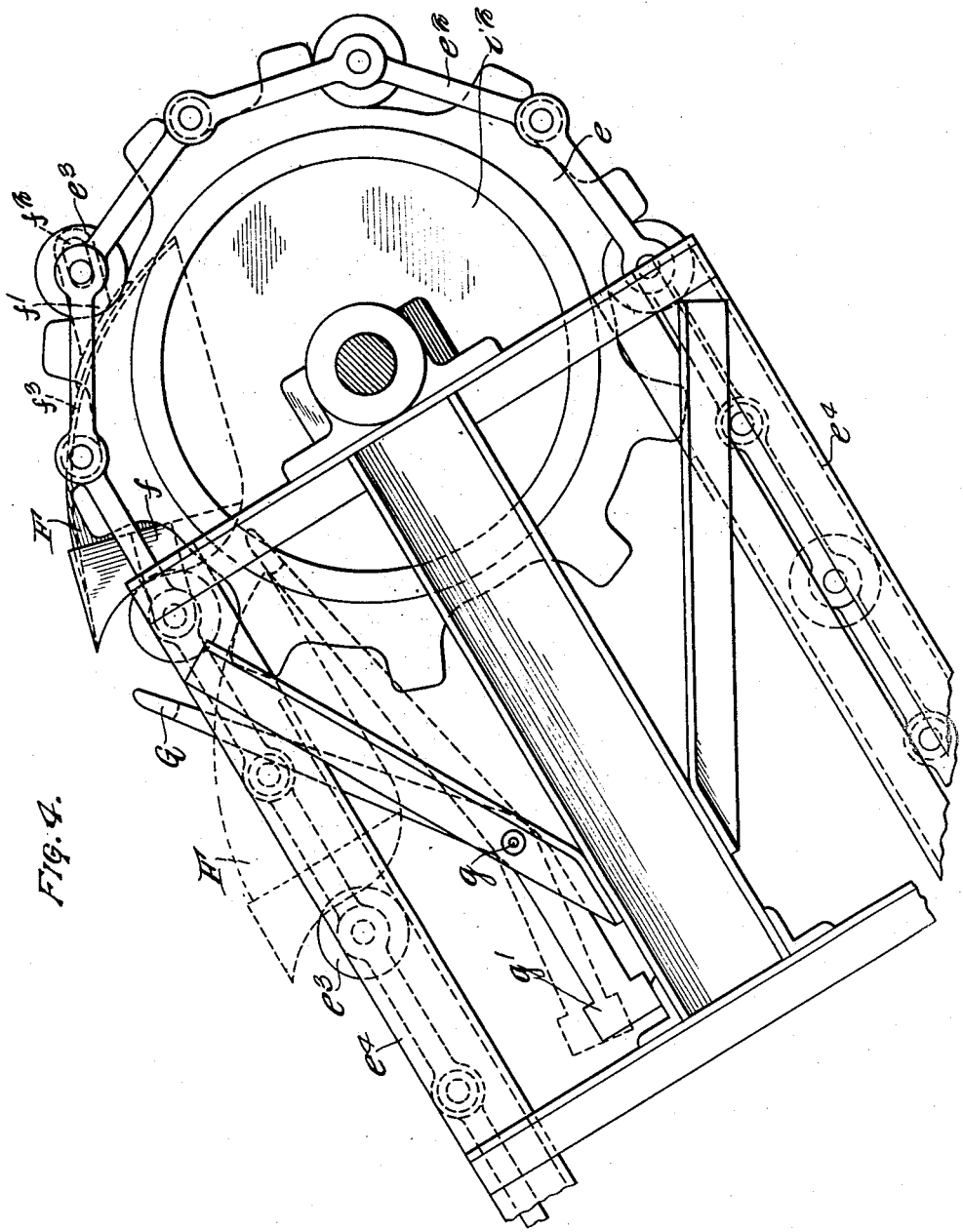

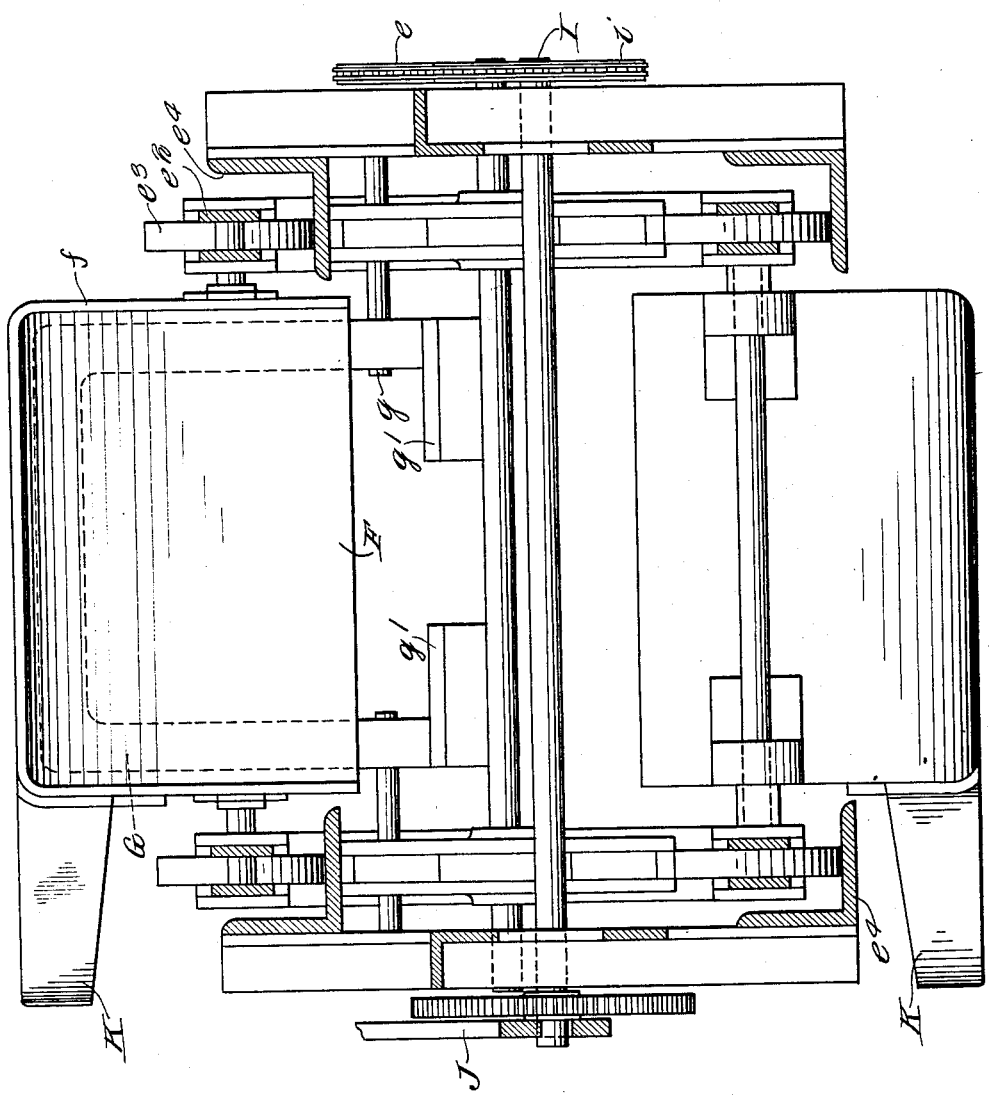

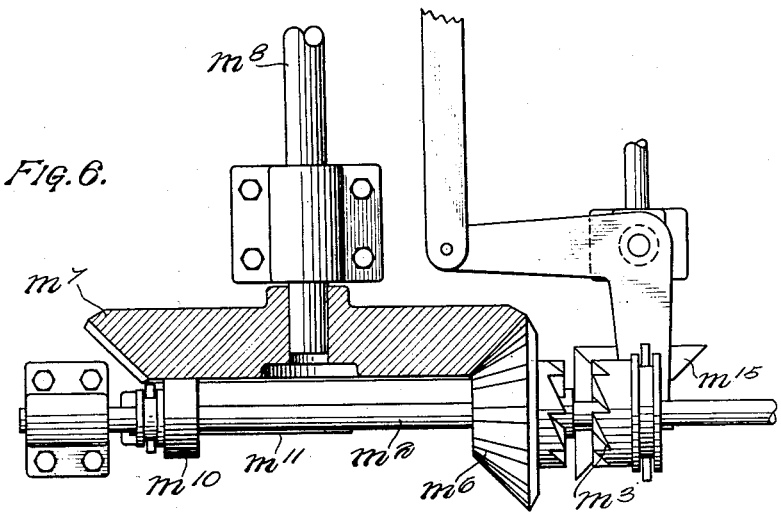
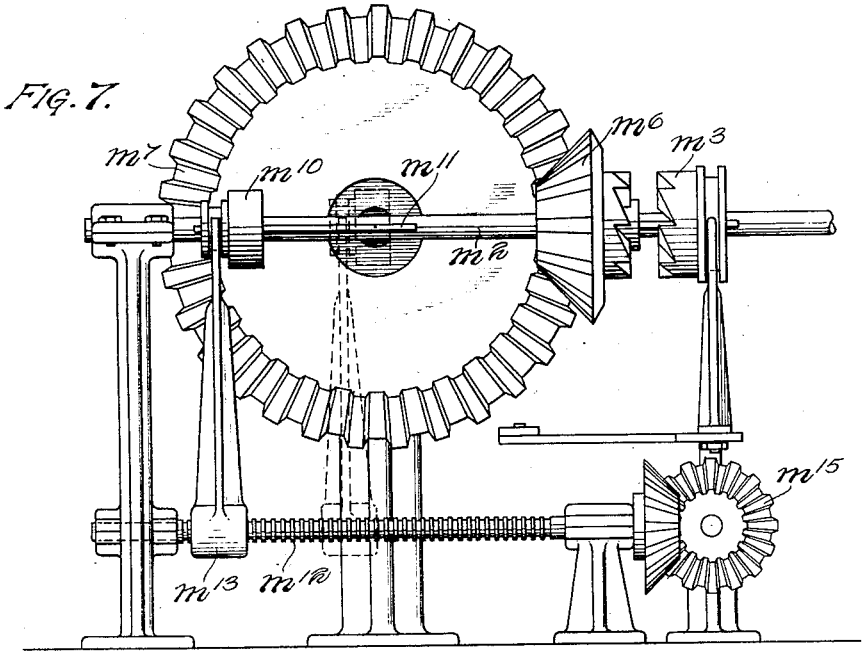

UNITED STATES PATENT OFFICE.

MORTON G. BUNNELL, OF CHICAGO, ILLINOIS, ASSIGNOR TO FREDERICK C. AUSTIN, OF CHICAGO, ILLINOIS.

EXCAVATOR.

1,172,579.  Specification of Letters Patent.  Patented Feb. 22, 1916.

Application filed October 24, 1910.  Serial No. 588,903.

*To all whom it may concern:*

Be it known that I, MORTON G. BUNNELL, a citizen of the United States of America, and resident of Chicago, Cook county, Illinois, have invented a certain new and useful Improvement in Excavators, of which the following is a specification.

My invention relates to excavators of that general class in which the buckets or scoops which take up and carry the dirt are mounted on endless chains that travel around sprockets arranged at opposite ends of a frame. In a machine of this kind the buckets or scoops take up the dirt at the lower end of the frame and then travel upward and discharge it at the upper end thereof. Thus the dirt is carried out of the excavation and dumped at the side thereof.

The object of my invention is to provide an improved excavator of this kind which will make a ditch by excavating the dirt at both sides thereof at the same time, and which will dump the dirt upon spoil banks at each side thereof, whereby the ditch is formed by making a series of downward excavations, each excavation joining the one ahead of it, and the machine being permitted each time to reach the bottom of the ditch before being moved along for the next excavation, as will hereinafter more fully appear.

To this and other useful ends my invention consists in matters hereinafter set forth and claimed.

In the accompanying drawings, Figure 1 is a rear elevation of an excavating machine embodying the principles of my invention, showing the bucket frames lowered and the buckets working in the ground, the excavated dirt being taken up and deposited at opposite sides of the ditch. Fig. 2 is a side elevation of the said machine. Fig. 3 is a plan thereof. Fig. 4 is an enlarged side elevation of the upper end portion of one of the bucket frames. Fig. 5 is an enlarged cross section on line 5—5 in Fig. 1. Fig. 6 is an enlarged plan view, partly in section, of the variable speed mechanism by which the bucket frames are given a variable feed or downward movement to enable the buckets to dig faster or deeper at the top of the excavation than at the bottom thereof, this being desirable and an advantage, inasmuch as the buckets have a much greater extent of travel along the ground while working at the bottom of the ditch than at the top thereof, thus making it possible to feed the bucket frame downward much faster at the top of the ditch than at the bottom thereof. Fig. 7 is a front elevation of the mechanism shown in Fig. 6.

As thus illustrated, my invention comprises a main frame A mounted on rear tractors B and front steering wheels C. At the rear of the machine a supplemental frame D is mounted and supported in position for up and down movement on guides $d$. The bucket frames E are secured obliquely upon the frame D, one at each side of the machine, and in such manner that they converge at their lower ends. Sprockets $e$ are arranged at the upper end of said frames E, and similar sprockets $e'$ at the lower ends thereof. The endless traveling sprocket chains $e^2$ are mounted upon said sprockets, and have rollers $e^3$ that run in the runways $e^4$, which latter are on the frames E. Buckets F are carried on the said chains, each bucket being disposed between the two chains of the frame, and each bucket having front and rear attaching portions $f$ and $f'$ that are pivoted to the chains at points of articulation therein, in any suitable manner, whereby the links of the chain may pass freely around the sprockets, as shown in Fig. 4. It will be seen that the buckets are arranged to dig into the ground as they travel upward on the underside of each frame E, and to upset and thereby discharge their contents at the upper ends of the said frames. Each bucket, after it has dumped its load, and after it has passed around and over the sprockets $e$, is entered by the bail-shaped cleaner G which is pivoted at $g$ and provided with a weighted rear end $g'$ which keeps it in normal position. These buckets have curved or rounded bottoms $f^3$ that are scraped even on the inside by the cleaner G, the latter tilting automatically to the position shown in dotted lines in Fig. 4, as the bucket passes over, and then returning to normal position in readiness for the next bucket.

At the bottom of the ditch, the ridge or elevation or dirt left between the slightly separated lower ends of the two bucket frames is broken off by the laterally swinging arm H which is pivoted at its upper end at $h$ and operated by a pitman $h'$ and crank $h^2$. This crank $h^2$ is on the shaft of the sprocket at the lower end of one of the frames E, and when the buckets are operating the arm H is vibrating back and forth. When the bottom of the ditch is reached, the machine can then be backed up to cut off the ridge left at the bottom of the previous cutting.

At a distance below its upper end, each frame F is provided with a shaft I having sprocket wheels $i$ connected by link belts $i'$ with the sprockets $i^2$ on the shafts of the upper sprockets $e$ of the bucket chains. The arms J are pivoted on the frame A at $j$ and provided with curved slots $j'$ that engage the shafts I, whereby these arms J are rocked when the frames E are raised and lowered. Sprockets $j^2$ are mounted on the inner ends of these arms J, and driving sprockets $j^3$ are mounted on the main frame A. Sprocket chains $j^4$ are arranged to travel around and upon the sprockets $j^2$ and $j^3$, and the sprockets $j^5$ on the shafts I, (see Fig. 3) whereby the bucket chains are operated. The sprockets $j^2$ serve as belt tighteners for the link belts $j^4$, as the arms J automatically preserve the requisite positions of these sprockets when the frames E are raised and lowered. Thus the driving connections are always in proper condition.

The buckets F may have cutters K that operate on the face or vertical wall L of the cut or excavation, when the frames E are in the ground, as shown in Fig. 2. These cutters may be mounted and arranged in any suitable manner, and project laterally under the frames E, to cut the dirt in front thereof, thus creating a clearance for the downward movement of the said frames.

The frames D and E are supported by chains or cables M that extend over sheaves $m$ on the upper end of the guides $d$. At the front of the machine a transverse drum shaft $m'$ is provided in the drum upon which the other ends of the said raising and lowering chains or cables M are wound. A short shaft $m^2$ is driven by the engine N and provided with a clutch $m^3$ controlled by a hand lever $m^4$ and connection $m^5$. This clutch governs the rotation of the bevel pinion $m^6$, which latter meshes with a bevel wheel $m^7$ on the shaft $m^8$. This shaft $m^8$ has a connection $m^9$ with the drum shaft $m'$. Thus by closing the clutch $m^3$ the frame E can be rapidly raised or lowered.

For gradually feeding the frame E downward, while the buckets are digging or cutting into the ground, the shaft $m^2$ is provided with a friction roller $m^{10}$ which is on a spline or feather $m^{11}$, and which engages the face of the wheel $m^7$ to drive the latter. A screw shaft $m^{12}$ carries a traveling nut $m^{13}$ that connects with the roll $m^{10}$ to move the latter back and forth across the face of the wheel $m^7$. This shaft or screw $m^2$ is controlled by a hand wheel $m^{14}$ at the excavating end of the main frame, through the medium of bevel gear connections $m^{15}$ and $m^{16}$ and $m^{17}$. In this way the operator or attendant can move the roll about the edge of the wheel $m^7$ inward to gradually feed the frames E downward, causing the feeding movement to become slower as the buckets approach the bottom of the ditch. The feeding motion thus accomplished can also be stopped suitably by moving the roll $m^{10}$ to the center of the wheel $m^7$, as here no motion is communicated to the shaft $m^2$. The main gearing $m^9$ serves to lock the frames at any up or down or intermediate position. When the bottom of the ditch is reached the closure of the clutch $m^3$ will serve to quickly raise the frames E above the ground.

Power transmitting connections are provided for the engine to the tractors B, and to the sprockets $j^3$. When the buckets are operating the tractors B are not moving, and vice versa, when the tractors operate to move the machine forward for another cut the buckets are not operating. These connections do not require any description, as they simply involve the well known use of gearing and clutches.

The machine is operated by feeding the frames E downward, while the buckets are running, until the bottom of the ditch is reached. Then the buckets are stopped, and the frame E raised above ground. The excavator is then moved forward the width of the frames E, and the operation is repeated to make another cut or excavation. Thus the ditch is made by a series of cuts or excavations, each joining the one which is in front, whereby a continuous channel is made to form a ditch. The bottom of said ditch is left clear and level, as the arm H works down the ridge in the manner already described.

The machine can be backed up while the buckets are running, so as to give a slope to the end wall of the ditch, particularly when the soil is soft and has a tendency toward giving. The character and length of the tractors B are such that the machine can back up to overhang the cut made by the buckets, and to bring the bucket frames away from the face of the cut. When the machine backs up, the arm H operates to break off or destroy the ridge of dirt that was left between the two bucket frames, and the dirt thus loosened is taken up by the buckets. In this way the machine trims or cleans up the bottom of the ditch as it goes along, leaving the bottom smooth and slightly depressed at the center thereof. Obviously, however, there are various ways of using or manipulating my improved machine, which will be obvious to those skilled in the art.

I do not limit myself to the exact construction shown and described.

What I claim as my invention is:

1. In an excavator, a pair of frames which converge downwardly, and which are disposed in the same vertical plane, an endless traveling series of buckets on each frame, means for operating said buckets, means for raising and lowering the frames, and means for changing the position of the excavator, a pivoted member for eliminating the ridge of dirt left between the lower ends of said frames, and means for operating said member.

2. In an excavator, a pair of frames which converge downwardly, and which are disposed in the same vertical plane, an endless traveling series of buckets on each frame, means for operating said buckets, means for raising and lowering the frames, means for changing the position of the excavator, a movable member for eliminating the ridge of dirt left between the lower ends of said frames, and means operated by the travel of one of said series of buckets for actuating said member.

3. In an excavator, a pair of frames which converge downwardly, and which are disposed in the same vertical plane, an endless traveling series of buckets on each frame, means for operating said buckets, means for raising and lowering the frames, means for changing the position of the excavator, a shaft for the lower end of each frame, a member for eliminating the ridge of dirt left between the lower ends of said frames, and means operated by one of said shafts for actuating said member.

4. In an excavator, a pair of frames which converge downwardly, and which are disposed in the same vertical plane, an endless traveling series of buckets on each frame, means for operating said buckets, means for raising and lowering the frames, means for changing the position of the excavator, a body having said frames disposed at the rear end thereof, means whereby said body can back up to overhang the face of the cut made by said buckets, and means for cutting a shallow groove in the bottom of the ditch when the machine backs up.

5. In an excavator, a pair of frames which converge downwardly, and which are disposed in the same vertical plane, an endless traveling series of buckets on each frame, means for operating said buckets, means for raising and lowering the frames, means for changing the position of the excavator, a pivoted member for eliminating the ridge of dirt left between the lower ends of said frames, means for operating said member, a body having said frames disposed at the extreme rear end thereof, and means whereby the body is supported entirely in front of the face of the cut made by said buckets.

6. In an excavator, a pair of frames which converge downwardly, and which are disposed in the same vertical plane, an endless traveling series of buckets on each frame, means for operating said buckets, means for raising and lowering the frames, means for changing the position of the excavator, a movable member for eliminating the ridge of dirt left between the lower ends of said frames, means operated by the travel of one of said series of buckets for actuating said member, a body having said frames disposed at the extreme rear end thereof, and means whereby the body is supported entirely in front of the face of the cut made by said buckets.

7. In an excavator, a pair of frames which converge downwardly, and which are disposed in the same vertical plane, an endless traveling series of buckets on each frame, means for operating said buckets, means for raising and lowering the frames, means for changing the position of the excavator, a shaft for the lower end of each frame, a member for eliminating the ridge of dirt left between the lower ends of said frames, means operated by one of said shafts for actuating said member, a body having said frames disposed at the extreme rear end thereof, and means whereby the body is supported entirely in front of the face of the cut made by said buckets.

8. An excavating machine for making ditches, comprising an inclined runway, an endless series of buckets traveling on said runway, a power transmitting belt connection for driving said buckets, leading to the upper end of said runway, means for bodily raising and lowering said runway, and automatic mechanism constructed and arranged to maintain said connection in operative condition during the lowering of said runway, operated by the downward movement thereof, said mechanism including an idler wheel and cam devices for shifting said wheel.

9. An excavating machine for making ditches, comprising an inclined runway, an endless series of buckets traveling on said runway, a power transmitting belt connection for driving said buckets, leading to the upper end of said runway, means for bodily raising and lowering said runway, and automatic mechanism constructed and arranged to maintain said connection to operative condition during the lowering of said runway, operated by the downward movement thereof, said mechanism including an idler wheel, a lever on which said wheel is mounted, and means for shifting said lever.

10. An excavator comprising an excavating device operating by downward movement thereof in the ground, and means operating by horizontal movement of said device for smoothing the ground at the bottom of the excavation, disposed in position whereby the dirt loosened by said horizontal movement of said means is swept up by backward motion of said device.

11. An excavator comprising an excavating device operating by downward movement thereof, and means operating by horizontal movement of said device for cutting a groove in the ground, disposed in position whereby the dirt loosened by said horizontal motion is swept up by said device, apparatus for raising and lowering said device and said means, and means for moving the entire machine backward to produce said horizontal movement.

12. An excavator comprising an excavating device operating by downward movement thereof, and another excavating device operating by horizontal movement of both devices, together with another excavating device like said first mentioned device, coöperating therewith to form a ditch with sloping banks, and to form a ridge between them in the path of the second device.

13. An excavator comprising an excavating device operating by downward movement thereof in the ground, and auxiliary digging means operating by horizontal movement of said device for smoothing the ground at the bottom of the excavation, together with another excavating device like said first mentioned device, coöperating therewith to form a ditch with sloping banks, and means whereby said three devices are raised and lowered bodily and in unison.

14. An excavator comprising an excavating device operating by downward movement thereof in the ground, and auxiliary digging means operating by horizontal movement of said device for cutting a groove in the ground, together with another excavating device like said first mentioned device, coöperating therewith at the bottom of the excavation to form a ditch with sloping banks, means for gradually lowering the two coöperating devices, and means for locking the machine to cause the second device to cut said groove.

Signed by me at Chicago, Illinois, this 14th day of Oct., 1910.

MORTON G. BUNNELL.

Witnesses:
S. LEWIS,
E. H. CLEGG.